(12) United States Patent
Nakahata et al.

(10) Patent No.: US 9,077,985 B2
(45) Date of Patent: Jul. 7, 2015

(54) VIDEO DISPLAY DEVICE AND SYSTEM

(75) Inventors: Yuji Nakahata, Kanagawa (JP); Toshiaki Suzuki, Kanagawa (JP)

(73) Assignee: Sony Corporation (JP)

( * ) Notice: Subject to any disclaimer, the term of this patent is extended or adjusted under 35 U.S.C. 154(b) by 613 days.

(21) Appl. No.: 12/802,882

(22) Filed: Jun. 16, 2010

(65) Prior Publication Data

US 2011/0007140 A1    Jan. 13, 2011

(30) Foreign Application Priority Data

Jul. 7, 2009    (JP) ............................... P2009-160905

(51) Int. Cl.
    *H04N 13/04*      (2006.01)
    *G09G 3/00*       (2006.01)

(52) U.S. Cl.
    CPC ........... *H04N 13/0497* (2013.01); *G09G 3/003* (2013.01); *G09G 2310/061* (2013.01); *G09G 2310/08* (2013.01); *G09G 2320/041* (2013.01); *G09G 2340/0435* (2013.01); *H04N 13/0438* (2013.01)

(58) Field of Classification Search
    CPC ......... H04N 7/18; H04N 5/262; G03B 21/14; G06F 17/10; G06K 9/00; G06N 5/00
    USPC ............ 345/8, 419, 690, 204; 348/51, 56, 57, 348/53, 207.99; 349/13; 353/8, 122; 359/227, 465; 382/128; 252/8, 122
    See application file for complete search history.

(56) References Cited

U.S. PATENT DOCUMENTS

| | | | |
|---|---|---|---|
| 2005/0041111 A1* | 2/2005 | Matsuoka ................. | 348/207.99 |
| 2005/0046617 A1* | 3/2005 | Kurtzer et al. ..................... | 345/8 |
| 2006/0158441 A1* | 7/2006 | Lee ................................ | 345/204 |
| 2006/0228010 A1* | 10/2006 | Rubbert et al. ................ | 382/128 |
| 2007/0035707 A1* | 2/2007 | Margulis ........................ | 353/122 |
| 2007/0229951 A1* | 10/2007 | Jung et al. ..................... | 359/465 |
| 2008/0129899 A1* | 6/2008 | Sharp .............................. | 349/13 |
| 2010/0208042 A1* | 8/2010 | Ikeda et al. ..................... | 348/53 |
| 2010/0289883 A1* | 11/2010 | Goris et al. ..................... | 348/56 |

FOREIGN PATENT DOCUMENTS

JP     2000-004451 A     1/2000

OTHER PUBLICATIONS

Sang Soo Kim et al, "World's First 240Hz TFT-LCD Technology for Full-HD LCD-TV and Its Application to 3D Display," SID 09 Digest, pp. 424-427 (2009).

\* cited by examiner

*Primary Examiner* — Y Lee
*Assistant Examiner* — Salame Amr
(74) *Attorney, Agent, or Firm* — Lerner, David, Littenberg, Krumholz & Mentlik, LLP

(57) ABSTRACT

In a video display device and system, a timing control section performs timing control for right- and left-eye video signals and to each have a blanking period whose length (Duty) is longer than that of a first-time blanking period Tb1 at least once in second-time and later blanking periods, e.g., performs timing control for a second-time blanking period Tb2 to be longer in Duty than the first-time blanking period Tb1. With such timing control, for stereoscopic display video viewing using open-state shutter glasses in the second-time blanking period Tb2 with a sequential write mode, there are advantages that the shutter glasses can remain longer in the open state while the response characteristics of the liquid crystal material being enhanced. As such, with the resulting video display device and system, the occurrence of crosstalk can be favorably prevented at the same time as reducing any reduction in display brightness.

13 Claims, 11 Drawing Sheets

VIDEO DISPLAY DEVICE AND SYSTEM

CROSS-REFERENCE TO RELATED APPLICATION

The present application claims priority from Japanese Patent Application No. JP 2009-160905 filed in the Japanese Patent Office on Jul. 7, 2009, the entire content of which is incorporated herein by reference.

BACKGROUND OF THE INVENTION

1. Field of the Invention

The present invention relates to a video display system using shutter glasses, and a video display device suited for use with such a system.

2. Description of the Related Art

For use as a display of a flat panel television and a mobile terminal device, an active-matrix liquid crystal display (LCD) including a thin film transistor (TFT) for each pixel is recently getting popular. In such a liquid crystal display, generally from the upper portion of the screen toward the lower portion thereof, the pixels are driven in response to when a video signal is line-sequentially written to an auxiliary capacity element and a liquid crystal element in each of the pixels.

In the liquid crystal display, considering the use thereof, one frame period is divided into a plurality of sub-frame periods for displaying various different video pieces based on the resulting divided sub-frame periods of time. Such driving is hereinafter referred to as time-division driving. The liquid crystal display operating in such a time-division driving mode includes a liquid crystal display operating in a field-sequential mode, a stereoscopic video display system using shutter glasses (Examples for reference include Patent Literature 1 (Japanese Unexamined Patent Publication No. 2000-4451), and Non-Patent Literature 1 (Sang Soo Kim and 5 others, "World's First 240 Hz TFT-LCD Technology for Full-HD LCD-TV and Its Application to 3D Display", SID 09 DIGEST, p. 424-427)), and others.

With a stereoscopic video display system using shutter glasses, one frame period is divided into two for displaying two video pieces alternately. The two video pieces are respectively for right and left eyes, and produce parallax. The shutter glasses used in the system performs an open/close operation in synchronization with such alternate video display. The shutter glasses are so controlled as to open the left-eye side thereof (to close the right-eye side thereof) during a period of displaying a left-eye video piece, and to open the right-eye side thereof (to close the left-eye side thereof) during a period of displaying a right-eye video piece. For implementation of stereoscopic viewing, a user wears such shutter glasses when he or she views video pieces on display.

SUMMARY OF THE INVENTION

With such a stereoscopic video display system, however, video pieces in sequence may suffer from interference for reasons due to the characteristics of the liquid crystal display and those of the shutter glasses, e.g., not enough response speed in the display, and not enough contrast in the shutter glasses. Such interference is hereinafter referred to as crosstalk, and such crosstalk causes a phenomenon in which the left-eye video piece becomes partially visible for the user's right eye, and the right-eye video piece becomes partially visible for his or her left eye.

In consideration thereof, using a sequential write mode as below may be a possibility. In this write mode, first of all, unit video pieces are output (written) each for a plurality of times one after another during a frame period. The shutter is then opened in a period when the liquid crystal material remains in any desired level of brightness by a full response to such writing of unit video pieces one after another. This accordingly enables to open the shutter only when the screen displays one same video piece in its entirety, and thus using such a sequential write mode is considered possible to prevent the occurrence of crosstalk.

Even when such a sequential write mode is used, however, the crosstalk is still caused easily at some position in the screen. This is because, in the shutter glasses, the starting time (timing) and the duration (Duty) of the period of opening the shutter are each set to a fixed value based on the center portion of the screen, for example. Specifically, for line-sequential writing from the upper to lower portion of the screen as described above, first of all, a time lag occurs until the upper and lower portion each reach its target level of brightness on the screen. As such, if the center portion of the screen is used as a basis to set the timing and the Duty of the shutter-open period, the upper and lower portion of the screen may both fail to reach the target level of brightness, thereby causing crosstalk easily. That is, each portion of the screen has its own optimal timing to start the shutter-open period and its own optimal Duty of the period for preventing the occurrence of crosstalk.

Also when such a mode is used, i.e., sequential write mode, the Duty of the shutter-open period shows a tendency to be relatively shorter than in the previous black insertion mode, i.e., mode of inserting a black image between any two video pieces. Due to such a tendency, the display brightness is to be reduced easily. Especially for preventing such screen-portion-basis crosstalk on the screen, the Duty of the shutter-open period is required to be much shorter, and thus the display brightness is to be reduced still further.

As such, during video display in the time-division driving mode, preventing the occurrence of crosstalk at the same time as preventing the reduction in display brightness is difficult, and thus there is a demand for a technology with no such difficulty. Note that the problems described above occur not only in the liquid crystal displays but also in other types of displays.

The invention is proposed in consideration of such problems, and it is thus desirable to provide a video display device and system with which the occurrence of crosstalk can be prevented at the same time as preventing the reduction in display brightness.

A video display device according to an embodiment of the invention includes a video processing section, a timing control section, and a display section. The video processing section performs output control over a plurality of video streams each including a plurality of unit video pieces in time sequence for output of the unit video pieces each for a plurality of times in a row, and for time-division switching of the video streams for output. The timing control section performs timing control over each of the unit video pieces to make variable at least either a starting time or a duration of each blanking period located between output periods of the unit video pieces coming from the video processing section. The display section performs video display based on each of the unit video pieces after the timing control. In such a device, the timing control section performs the timing control over each of the video streams to have, in a blanking period following immediately after a second-time or later output of the unit video pieces, at least one second blanking period that is longer in length (Duty) than a first blanking period following immediately after a first-time output of the unit video pieces. Herein, the expression of "video stream" denotes a series of unit video pieces arranged in time sequence, and is exemplified by a left-eye video stream and a right-eye video stream for use in stereoscopic video display, for example. When such a video stream is of 60 Hz, for example, it means that still images therein are displayed one after another in a cycle of 60 Hz, and these still images are each a "unit video piece" in the above.

A video display system according to another embodiment of the invention includes the video display device according to the above embodiment of the invention, and shutter glasses. The video display device performs video display by time-division switching of a plurality of video streams each including a plurality of unit video pieces in time sequence, and the shutter glasses performs an open/close operation in synchronization with the switching of the video streams in the video display device.

In the video display device and system according to the embodiments of the invention as such, timing control is performed over each of the unit video pieces to make variable at least either a starting time or a duration of each of the blanking periods located between the output periods of the unit video pieces after the output control performed as above. With the timing control at this time, the video streams are each controlled to have, in any of the blanking periods following immediately after a second-time or later output of the unit video pieces, at least one blanking period (second blanking period) that is longer in Duty than a first blanking period following immediately after a first-time output of the unit video pieces. This accordingly enhances the response characteristics of the liquid crystal material during viewing of display video in the second-time or later blanking periods using the shutter glasses that performs an open/close operation in synchronization with the switching of a plurality of video streams. Moreover, the shutter-open period in the shutter glasses (e.g., corresponding to the second blanking period above) can be set longer in duration than in the case of outputting the unit video pieces all at the equally-controlled timing for an equally-controlled duration.

With the video display device and system according to the embodiments of the invention, timing control is so performed that each of the video streams is to have, in any of the blanking periods following immediately after a second-time or later output of the unit video pieces, at least one blanking period (second blanking period) that is longer in Duty than a first blanking period following immediately after a first-time output of the unit video pieces. Accordingly, for viewing of display video in the second-time or later blanking periods using the shutter glasses, the shutter-open period in the shutter glasses can be set longer in duration at the same time as enhancing the response characteristics of the liquid crystal material. Therefore, during viewing of display video as such, the occurrence of crosstalk can be prevented while any reduction in display brightness is prevented.

DETAILED DESCRIPTION OF THE PREFERRED EMBODIMENT

In the below, an embodiment of the invention is described in detail by referring to the accompanying drawings. The description is given in the following order.

1. Embodiment (Example with an earlier start timing of second-time writing (output)
2. Modified Examples
   Modified Example 1 (Example with a shorter period for first-time writing (output))
   Modified Example 2 (Example with periods for writing (output) all having the same length but shorter)
   Modified Example 3 (Example with periods for writing (output) to be changed in length)
   Modified Example 4 (Example with any adjustment to be made in accordance with a temperature change in the operation environment)
   Modified Example 5 (Example with any adjustment to be made in accordance with video contents)
   Modified Example 6 (Example of application to multi-video display system)

1. Embodiment

Entire Configuration of Video Display System

Figure 1:
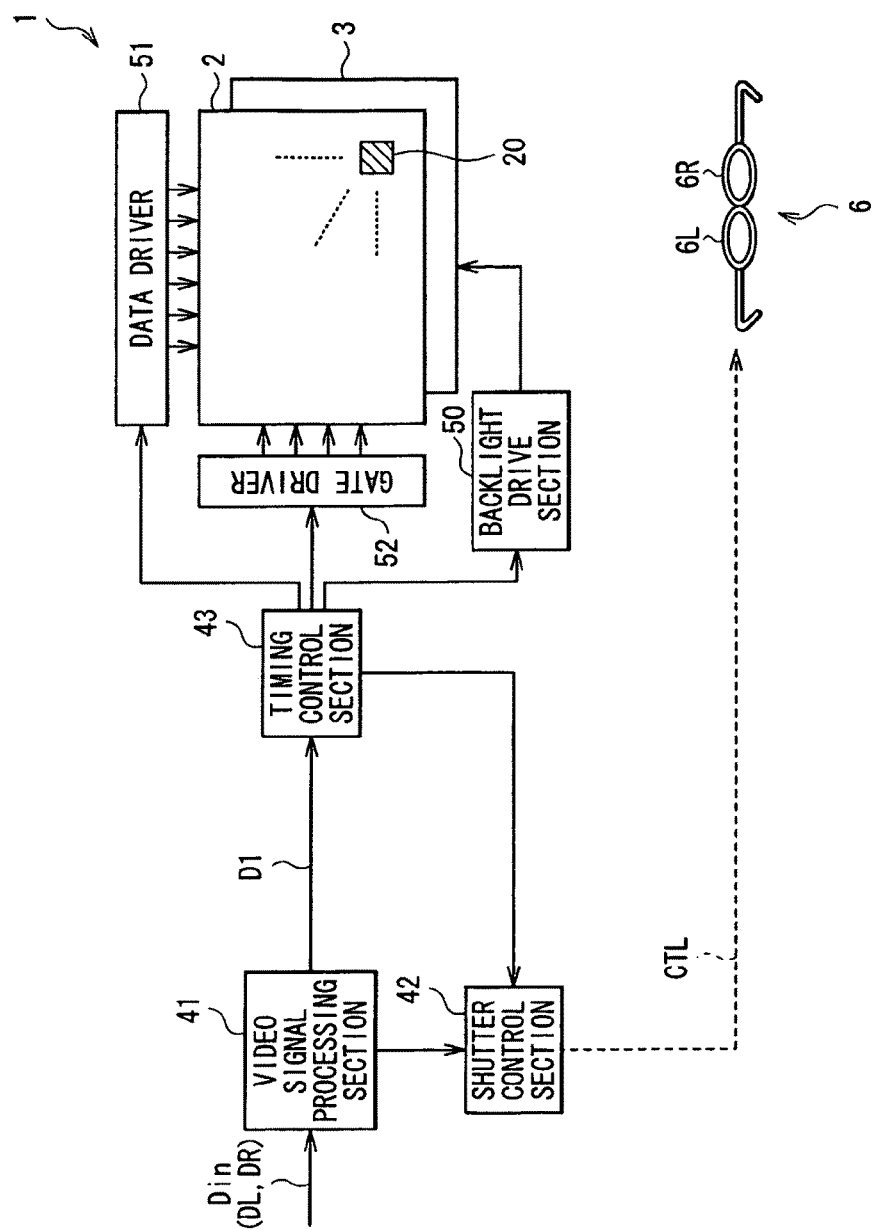
FIG. 1 is a block diagram showing the entire configuration of a video display system provided with a video display device in an embodiment of the invention.

FIG. 1 is a block diagram showing the configuration of a video display system in an embodiment of the invention. This video display system is a stereoscopic video display system operating in a time-division driving mode, and is configured to include a video display device, i.e., a liquid crystal display 1, and shutter glasses 6 in the embodiment of the invention.

The liquid crystal display 1 is in charge of video display based on an input video signal Din. The input video signal Din is made up of a right-eye video signal DR and a left-eye video signal DL, which produce horizontal parallax. The right-eye video signal DR is plurally contained in a right-eye video stream, and the left-eye video signal DL is plurally contained in a left-eye video stream. Such a liquid crystal display 1 is configured to include a liquid crystal display panel 2, a backlight 3, a video signal processing section 41, i.e., video processing section, a shutter control section 42, a timing control section 43, a backlight drive section 50, a data driver 51, and a gate driver 52.

The backlight 3 is a light source from which a light comes for exposure of the liquid crystal display panel 2, and is configured to include an LED (Light Emitting Diode), and a CCFL (Cold Cathode Fluorescent Lamp), for example.

The liquid crystal display panel 2 is operated in accordance with a drive signal provided by the gate driver 51 that will be described later, and performs video display based on the input video signal Din by modulating a light coming from the backlight 3 based on a video voltage provided by the data driver 51. To be more specific about such video display, although the details will be described later, a right-eye video piece based on the right-eye video signal DR (right-eye unit video piece plurally contained in a right-eye video stream) is displayed alternately by time division with a left-eye video piece based on the left-eye video signal DL (left-eye unit video piece plurally contained in a left-eye video stream). That is, with such a liquid crystal display panel 2, video display is performed in the order of output controlled by the video signal processing section 41 (will be described later). With such video display, the time-division driving for stereoscopic video display is performed. This liquid crystal display panel 2 includes a plurality of pixels 20 arranged in a matrix in its entirety.

Figure 2:
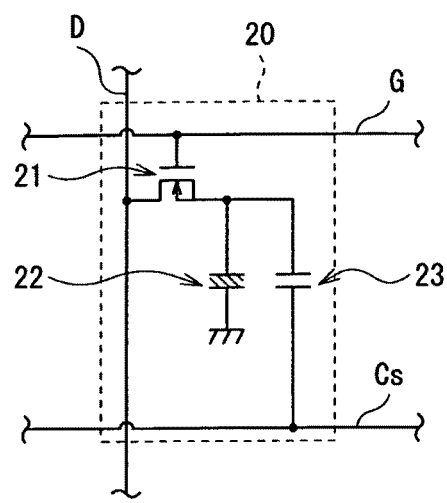
FIG. 2 is a circuit diagram showing an exemplary detailed configuration of a pixel of FIG. 1.

By referring to FIG. 2, described now is the detailed configuration of each of the pixels 20. FIG. 2 shows an exemplary circuit configuration of a pixel circuit in each of the pixels 20. The pixels 20 are each configured to include a liquid crystal element 22, a TFT (Thin Film Transistor) element 21, and an auxiliary capacity element 23. Such pixels 20 are each connected with a gate line G, a data line D, and an auxiliary capacity line Cs. The gate line G is used for line-sequentially selecting any of the pixels as a drive target, and the data line D is for supplying a video voltage to the pixel selected as a drive target. The video voltage here is the one provided by the data driver 51.

The liquid crystal element 22 is in charge of display operation in accordance with the video voltage provided to an end thereof from the data line D via the TFT element 21. This liquid crystal element 22 includes a liquid crystal layer (not shown) sandwiched by a pair of electrodes (not shown). The liquid crystal layer herein is made of a liquid crystal material of a VA (Vertical Alignment) mode or a TN (Twisted Nematic) mode. One (end) of the electrodes in the liquid crystal element 22 is connected to the drain of the TFT element 21, and to one end of the auxiliary capacity element 23. The remaining (end) of the electrodes is grounded. The auxiliary capacity element 23 serves to stabilize the accumulated charge of the liquid crystal element 22. As to such an auxiliary capacity element 23, one end is connected to one end of the liquid crystal element 22 and to the drain of the TFT element 21, and the remaining end is connected to the auxiliary capacity line Cs. The TFT element 21 is a switching element for supplying a video voltage based on a video signal D1 to one end of the liquid crystal element 22 and to one end of the auxiliary capacity element 23. Such a TFT element 21 is configured by a MOS-FET (Metal Oxide Semiconductor-Field Effect Transistor). In this TFT element 21, the gate is connected to the gate line G, the source is connected to the data line D, and the drain is connected to one end of the liquid crystal element 22 and to one end of the auxiliary capacity element 23.

The video signal processing section 41 generates the video signal D1 through control over the input video signal Din in terms of the output order (writing order, and display order) for the right- and left-eye video signals DR and DL. To be specific, the output order is so controlled that the right- and left-eye video signals DR and DL are to be output sequentially each for a plurality of times (twice in this example), and at the same time, these video signals are to be output alternately in a time-division manner in one frame period. That is, in this example, the video signal Di is so generated that the right- and left-eye video signals DR and DL are to be output in the order of DL, DL, DR, and DR. Note that, in one frame period, a duration in which the left-eye video signal DL is output (written) twice in a row is referred to as "L sub-frame period", and a duration in which the right-eye video signal DR is output (written) twice in a row is referred to as "R sub-frame period".

The timing control section 43 is for controlling the drive timing of the components, i.e., the backlight drive section 50, the gate driver 52, and the data driver 51, and for supplying the video signal D1 coming from the video signal processing section 41 to the data driver 51. Herein, in the timing control section 43, the video signal D1 may be subjected to overdrive processing.

The timing control section 43 also performs timing control to make variable at least either the starting time (timing) and the duration (Duty) of each blanking period (details will be described later) in the video signal D1 coming from the video signal processing section 41. The timing control section 43 performs timing control also over the shutter control section 42, i.e., to make the shutter glasses to go into the open state in a second-time blanking period Tb2 that will be described later. Such timing control will be described more in detail later. In the below, exemplified is a case that such timing control is performed by the timing control section 43, but alternatively, the video signal processing section 41 may be in charge thereof, for example.

The gate driver 52 is for line-sequentially driving the pixels 20 in the liquid crystal display panel 2 along the gate lines G described above. Such line-sequential driving is performed in accordance with the timing control performed by the timing control section 43.

The data driver 51 is for supplying a video voltage to each of the pixels 20 in the liquid crystal display panel 2 based on the video signal D1 coming from the timing control section 43. To be specific, the video signal D1 is subjected to D/A (Digital/Analog) conversion, and the resulting analog signal, i.e., video signal (above-described video voltage) is output to each of the pixels 20.

The backlight drive section 50 is for controlling an illumination operation (light emission operation) of the backlight 3 also in accordance with the timing control performed by the timing control section 43. However, in the embodiment, such control over the illumination operation (light emission operation) of the backlight 3 may not be performed.

Configurations of Shutter Control Section 42 and Shutter Glasses 6

The shutter control section 42 is for outputting a timing control signal (control signal CTL) to the shutter glasses 6. The output of the timing control signal is corresponding to the output timing of the right- and left-eye video signals DR and DL by the video signal processing section 41. Herein, although such a control signal CTL is exemplified as being a radio signal such as infrared signal, but may be also a cable signal.

The shutter glasses 6 are for use by a user (not shown in FIG. 1) of the liquid crystal display 1, thereby enabling stereoscopic viewing. The shutter glasses 6 are configured to include a left-eye lens 6L and a right-eye lens 6R, which are each provided with a light-shielding shutter (not shown) such as liquid crystal shutter. Such light-shielding shutters are each controlled to be in a state with a light-shielding function thereof being active, i.e., open state, and in a state with the light-shielding function thereof being inactive, i.e., closed state. Such state control is performed based on the control signal CTL coming from the shutter control section 42. To be specific, although the details will be described later, the shutter control section 42 controls the shutter glasses 6 in such a manner that the left- and right-eye lenses 6L and 6R are changed in state from/to open to/from closed alternately in synchronization with a switching of the left- and right-eye video pieces for display.

Effects and Advantages of Video Display System

Described next is the effects and advantages of the video display system in the embodiment.

1. Stereoscopic Video Display Operation

By referring to FIGS. 1 to 3B, described first is the outline of a stereoscopic video display operation in the video display system.

With this video display system, in the liquid crystal display 1 of FIG. 1, the video signal processing section 41 generates the video signal D1 through control over the input video signal Din in terms of the output order (writing order, and display order) for the right- and left-eye video signals DR and DL. Next, the shutter control section 42 outputs, to the shutter glasses 6, the control signal CTL corresponding to the output timing of such right- and left-eye video signals DR and DR. The video signal D1 provided by the video signal processing section 41 is provided to the data driver 51 via the timing control section 43. The data driver performs D/A conversion to the video signal D1, and generates a video voltage being an analog signal. The display driving operation is then performed by the drive voltage provided by the gate driver 52 and the data driver 51 to each of the pixels 20.

Specifically, as shown in FIG. 2, a selection signal coming from the gate driver 52 over the gate line G is used as a basis for a switching of the ON/OFF operation of the TFT element 21. This accordingly makes electrically continuous the area formed by the data line D, the liquid crystal element 22, and the auxiliary capacity element 23. As a result, the liquid crystal element 22 is provided with a video voltage based on the video signal D1 provided by the data driver 51, whereby the line-sequential display driving operation is performed. In this Specification, during such line-sequential driving, the scanning direction, i.e., direction of video writing, is in the direction perpendicular to the screen of the liquid crystal display panel 2, i.e., vertical direction.

With the pixels 20 each provided with the video voltage as such, an illumination light coming from the backlight 3 is modulated in the liquid crystal display panel 2, and the modulation result is emitted as a display light. As such, video display based on the input video signal Din is performed in the liquid crystal display 1. To be specific, a left-eye video piece based on the left-eye video signal DL is displayed alternately with a right-eye video piece based on the right-eye video signal DR in a frame period so that the display driving operation is performed by time-division driving.

Figure 3A:
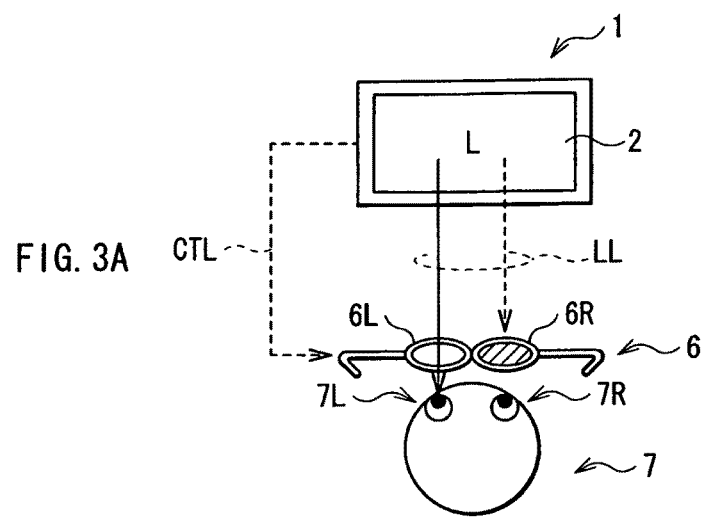
FIGS. 3A and 3B are each a schematic diagram outlining a stereoscopic video display operation in the video display system of FIG. 1.
Figure 3B:
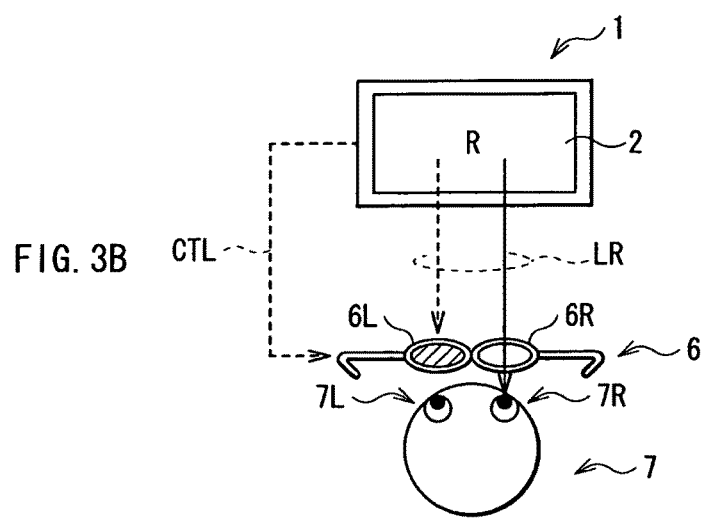

At this time, as shown in FIG. 3A, for display of a left-eye video piece, in response to the control signal CTL, the light-shielding function of the right-eye lens 6R is made active in the shutter glasses 6 in use by a user 7, and the light-shielding function of the left-eye lens 6L is made inactive therein. That is, the left-eye lens 6L goes into the open state for a display light LL to pass therethrough during display of the left-eye video piece, and the right-eye lens 6R goes into the closed state not to allow the display light LL to pass therethrough. On the other hand, as shown in FIG. 3B, for display of a right-eye video piece, in response to the control signal CTL, the light-shielding function of the left-eye lens 6L is made active, and the light-shielding function of the right-eye lens 6R is made inactive. That is, the right-eye lens 6R goes into the open state for a display light LR to pass therethrough during display of the right-eye video piece, and the left-eye lens 6L goes into the closed state not to allow the display light LR to pass therethrough. Such a state change is alternately repeated in a time division manner, and thus the user 7 can view the video three-dimensionally by looking at the display screen of the liquid crystal display 1 while wearing the shutter glasses 6. That is, the user 7 views the left-eye video pieces by his or her left eye 7L and the right-eye video pieces by his or her right eye 7R, and due to parallax to be produced thereby, the user 7 perceives the resulting video pieces with the three-dimensional appearance with depth.

2. Sequential Write/Display Operation

By referring to FIGS. 4 to 7, in comparison with comparison examples, described in detail next is a sequential write/display operation being one of the features of the invention.

Comparison Example 1

Figure 4:
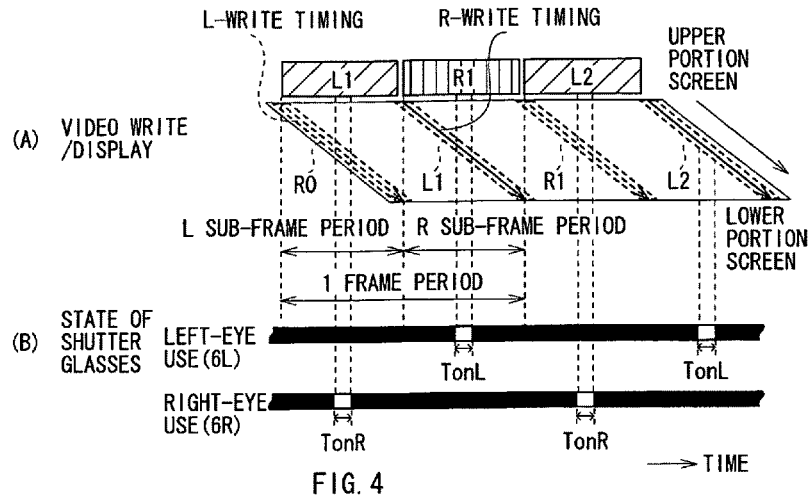
FIG. 4 is a timing chart for illustrating crosstalk possibly caused during a stereoscopic video display operation in a comparison example 1.

FIG. 4 is a timing chart of the previous stereoscopic video display operation in the above-described time-division driving mode, i.e., comparison example 1. In FIG. 4, A shows a video write/display operation, and B shows the state of the shutter glasses 6, i.e., the left-eye lens 6L and the right-eye lens 6R. In A of FIG. 4, the solid arrows each denote a write timing of a right-eye video signal, i.e., R-write timing, and the broken arrows each denote a write timing of a left-eye video signal, i.e., L-write timing. This is also applicable below. Also in A of FIG. 4, portions of "R0", "L1", and others enclosed by broken lines each indicate a period when its corresponding video piece, e.g., a right-eye video piece R0 or a left-eye video piece L1, remains at any desired level of display brightness, and this is also applicable below. On the other hand, in B of FIG. 4, black-shaded portions each indicate a shutter-closed period for each of the left- and right-eye lenses 6L and 6R, and the remaining white portions indicate shutter-open periods TonL and TonR respectively for the lenses 6L and 6R, and this is also applicable below.

In such a stereoscopic video display operation in the comparison example 1, as shown in A of FIG. 4, a left-eye video signal is written once into the liquid crystal display panel 2 in each L sub-frame period in one frame period, thereby displaying left-eye video pieces L1, L2, and others. Similarly in each R sub-frame period, a right-eye video signal is written once into the liquid crystal display panel 2, thereby displaying right-eye video pieces R1, R2, and others. At this time, the liquid crystal material needs time to respond in the liquid crystal display panel 2, and thus reaching any desired level of brightness takes time from each write timing. That is, from each L-write timing, it takes time until a left-eye video piece is displayed in any desired level of brightness, i.e., until the panel reaches any desired level of brightness for a left-eye video piece, and from each R-write timing, it takes time until a right-eye video piece is displayed in any desired level of brightness, i.e., until the panel reaches any desired level of brightness for a right-eye video piece. On the other hand, as shown in B of FIG. 4, in the shutter glasses 6, the left- and right-eye lenses 6L and 6R are respectively set with the shutter-open periods TonL and TonR between the L- and R-write timings, for example.

With the liquid crystal display device in the time-division driving mode as such, the writing of video is performed line-sequentially from the upper to lower portion of the screen in one frame period as shown in A of FIG. 4. Therefore, no matter how the shutter-open periods TonL and TonR are set, the following problems occur. That is, as shown in A of FIG. 4, any successive video pieces, i.e., right- and left-eye video pieces, cause mixture of video (interference or crosstalk) therebetween. If crosstalk is caused as such, the resulting video provided for the user to view will be right and left reverse on the screen of the stereoscopic video display system, and thus the user hardly perceives the video as three-dimensional. Such crosstalk is caused due to the characteristics of the liquid crystal display and those of the shutter glasses, e.g., not enough response speed in the display, and not enough shutter contrast in the shutter glasses.

Comparison Example 2

Figure 5:
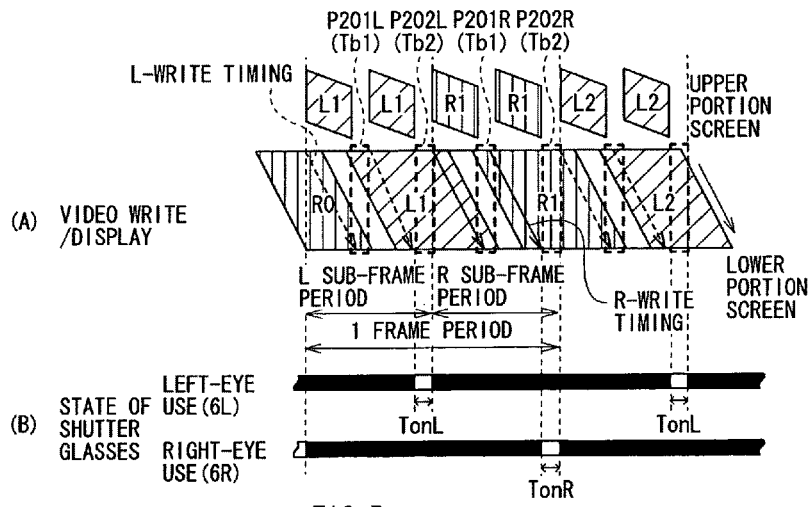
FIG. 5 is a timing chart of a stereoscopic video display operation in a comparison example 2.

Due to such problems, performing a stereoscopic video display operation in a sequential write mode as shown in FIG. 5 is considered as a possibility. FIG. 5 is a timing chart of a stereoscopic video display operation in a sequential write mode in the comparison example 2, and similarly to FIG. 4, A shows a video write/display operation, and B shows the state of the shutter glasses 6, i.e., the left-eye lens 6L and the right-eye lens 6R.

With the stereoscopic video display operation in the sequential write mode as such, as shown in A of FIG. 5, a left-eye video signal is written twice in a row into the liquid crystal display panel 2 in each L sub-frame period in one frame period, thereby displaying the left-eye video pieces L1, L2, and others. Similarly in each R sub-frame period, a right-eye video signal is written twice in a row into the liquid crystal display panel 2, thereby displaying the right-eye video pieces R1, R2, and others. That is, in one frame period, the right- and left-eye video pieces are to be output in the order of L1, L1, R1, and R1. Then in each sub-frame period, i.e., L sub-frame period and R sub-frame period, while the liquid crystal material remains in any desired level of brightness on the entire screen after the completion of video signal writing for the second time, i.e., writing of a left- or right-eye video signal, the shutter glasses 6 go into the open state. That is, as shown in B of FIG. 5, the shutter-open periods TonL and TonR are so set as to be between the second-time L- or R-write timing for either the left- or right-eye video piece, and the first-time L- or R-write timing for the remaining left- or right-eye video piece, i.e., in a second-time blanking period. For the purpose of ensuring the desired level of display brightness, these shutter-open periods TonL and TonR are sometimes both set longer than the second-time blanking period. In this example, the first-time blanking period corresponds to portions indicated by reference numerals P201L and P201R in A of FIG. 5, i.e., blanking period Tb1, and the second-time blanking period corresponds to portions indicated by reference numerals P202L and P202R also in A of FIG. 5, i.e., blanking period Tb2. Note that, in this comparison example 2, these first- and second-time blanking periods Tb1 and Tb2 both have the same Duty.

As such, unlike stereoscopic video display operation in the comparison example 1 of FIG. 4, after the adequate response of the liquid crystal material as a result of the sequential writing as above, the shutter glasses 6 can go into the open state. This accordingly enhances the response characteristics of the liquid crystal material, and thus is considered a possibility to prevent the occurrence of such crosstalk as described above.

Even when such a sequential write mode is used, however, the crosstalk is still caused easily at some position in the screen. This is because, in the shutter glasses 6, the starting time (timing) and the duration (Duty) of the period of opening the shutter are each set to a fixed value based on the center portion of the screen, for example. Specifically, for the line-sequential writing from the upper to lower portion of the screen as described above, first of all, a time lag occurs until the upper and lower portion each reach its target level of brightness on the screen. As such, if the center portion of the screen is used as a basis to set the timing for the shutter-open period and the Duty of the period, the upper and lower portion of the screen may both fail to reach the target level of brightness, thereby causing crosstalk easily. That is, each portion of the screen has its own optimal timing to start the shutter-open period and its own optimal Duty of the period for preventing the occurrence of crosstalk.

Figure 6:
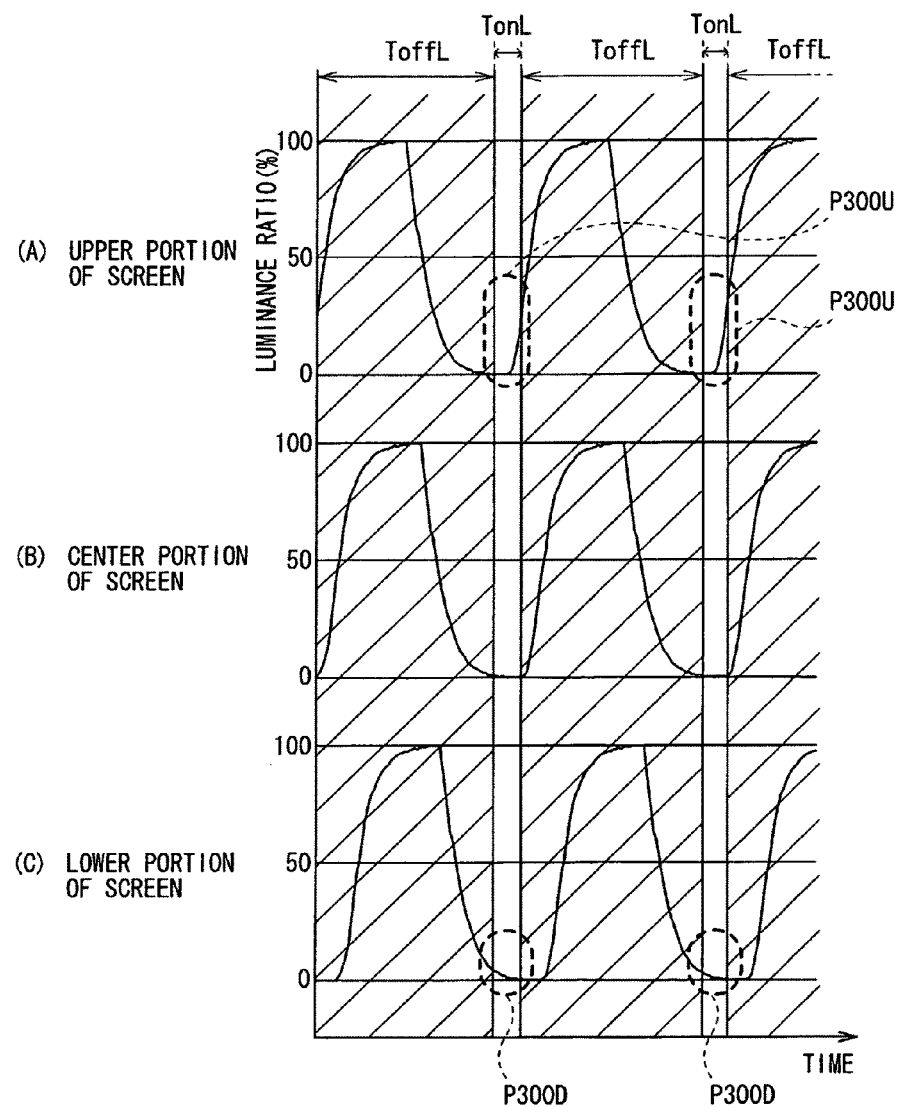
FIG. 6 is a timing waveform chart for illustrating screen-portion-basis crosstalk in the screen possibly caused during the stereoscopic video display operation in the comparison example 2.

In FIG. 6, A to C each show the ratio of brightness in the shutter-open period TonL and the shutter-closed period ToffL (hatched portion) for the left-eye lens in the shutter glasses. Specifically, A shows such a ratio in the upper portion of the screen, B in the center portion thereof, and C in the lower portion thereof. Exemplified now is a case of, in each of the portions A to C, writing a video voltage of 0 shade of gray as a left-eye video piece, and a video voltage of 255 shades of gray as a right-eye video piece. Also the timing for the shutter-open period TonL is assumed as being fixed in value in advance based on the center portion of the screen, for example, i.e., to enable display with the target brightness at the center portion of the screen as in B of FIG. 6. In this case, in the center portion of the screen, i.e., in B of FIG. 6, the occurrence of crosstalk is prevented because the shutter-open period TonL is set to the values optimal for the timing and Duty thereof. However, crosstalk is observed in the upper portion of the screen, i.e., in A of FIG. 6, where the write timing comes earlier than the center portion of the screen, i.e., where the scanning start position is close, and in the lower portion of the screen, i.e., in C of FIG. 6, where the write timing comes later, i.e., where the scanning end position is close (refer to reference numerals P300U and P300D in FIG. 6). Such crosstalk is observed also when the shutter-open periods TonL and TonR are set to be longer than the second-time blanking period Tb2 as described above. Note that even if the shutter-open periods TonL and TonR are set to have the same Duty as the second blanking period Tb2, such crosstalk is observed in any portion with high and low gray level due to the slow response of the liquid crystal material. When the crosstalk is caused as such, specifically, in the upper portion of the screen, a right-eye video piece being a next display target partially appears in a left-eye video piece that is a current display target, and in the lower portion of the screen, a right-eye video piece being a previous display target partially appears in the left-eye video piece that is a current display target.

Also when such a sequential write mode is used, the Duty of the shutter-open period shows a tendency to be relatively shorter than in the previous black insertion mode, i.e., mode of inserting a black image between any two video pieces. Due to such a tendency, the display brightness is to be reduced easily. Especially for preventing the occurrence of such screen-portion-basis crosstalk, the Duty of the shutter-open period is required to be much shorter, and thus the display brightness is to be reduced still further.

Embodiment

In consideration thereof, in the embodiment, the timing control section 43 performs timing control that is now described in detail to make variable at least either the starting time (timing) and the duration (Duty) of each of the blanking periods Tb1 and Tb2 in the video signal D1.

Figure 7:
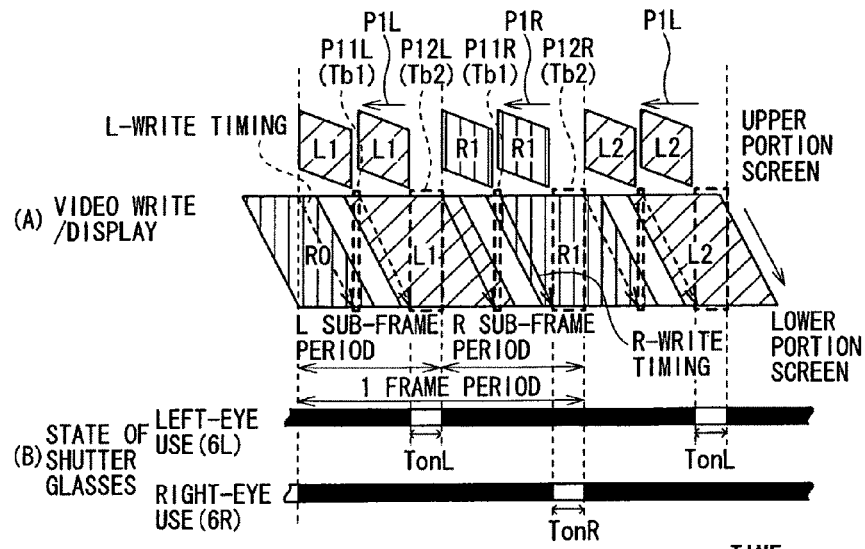
FIG. 7 is a timing chart of a stereoscopic video display operation in the embodiment.

FIG. 7 is a timing chart of a stereoscopic video display operation in a sequential write mode of the embodiment. Similarly to FIGS. 4 and 5, in FIG. 7, A shows a video write/display operation, and B shows the state of the shutter glasses 6, i.e., the left-eye lens 6L and the right-eye lens 6R.

The timing control section 43 performs timing control in such a manner that the right- and left-eye video signals DR and DL each have a blanking period (second blanking period) whose duration (Duty) is longer than that of the first-time blanking period Tb1 (first blanking period) at least once in the second-time and later blanking periods. That is, unlike the comparison example 2 described above, the timing control is so performed that the second-time blanking period Tb2 has the Duty longer than that in the first-time blanking period Tb1 (refer to reference numerals P11L, P12L, P11R, and P12R in A of FIG. 7).

To be specific, for implementation of such timing control, in this embodiment, the starting time (timing) of a second-time output (writing) of the unit video pieces, e.g., left-eye video pieces L1 and L2 and right-eye video piece R1, is so controlled as to come earlier (refer to arrows P1L and P1R in A of FIG. 7). That is, the timing control is so performed that the timing to start the second-time output of the unit video pieces comes earlier than in a case of outputting (writing) the unit video pieces all at the equally-controlled time (timing) for the equally-controlled duration (Duty), i.e., a case corresponding to the comparison example 2 described above.

As such, for stereoscopic display video viewing using the open-state shutter glasses 6 in the second-time or later blanking periods (in this example, second-time blanking period Tb2) with a sequential write mode, there are the advantages as below compared with the comparison example 2 described above. That is, similarly to the comparison example 2 above, first of all, the shutter glasses 6 go into the open state after the adequate response of the liquid crystal material to the sequential writing. This accordingly enhances the response characteristics of the liquid crystal material, and thus is considered a possibility to prevent the occurrence of crosstalk. In this example, the shutter-open period in the shutter glasses 6 is set to be longer in duration (Duty) than in the case of outputting the unit video pieces all at the equally-controlled time (timing) for the equally-controlled duration (Duty).

Also in this example, the length of a frame period in its entirety, and the total Duty of the blanking periods Tb1 and Tb2 in the frame period, are so controlled as to remain the same as before the change, i.e., corresponding to the case in the comparison example 2, thereby remaining consistent with the input video signal Din.

As such, in the embodiment, the timing control section 43 performs the timing control in such a manner that the right- and left-eye video signals DR and DL are to each have a blanking period whose duration (Duty) is longer than that of the first-time blanking period Tb1 at least once in the second-time or later blanking periods. That is, in this example, the timing control is so performed that the second-time blanking period Tb2 has the Duty longer than that in the first-time blanking period Tb1. Accordingly, for stereoscopic display video viewing using the open-state shutter glasses 6 in the second-time or later blanking periods with a sequential write mode, there are the advantages of being able to set longer the shutter-open period in the shutter glasses 6 while enhancing the response characteristics of the liquid crystal material. During stereoscopic display video viewing as such, the occurrence of crosstalk can be thus prevented at the same time as preventing the reduction in display brightness.

To be specific, the timing control is so performed that the timing to start the second-time output of the unit video pieces, e.g., the left-eye video pieces L1 and L2 and the right-eye video piece R1, so that the effects as described above can be favorably achieved.

Moreover, the timing control section 43 performs the timing control over the shutter control section 42 in such a manner that the shutter glasses 6 go into the open state in the second-time blanking period Tb2 so that the effects as described above can be favorably achieved.

Modified Examples

Described next are several modified examples of the invention. Note that any component same as that in the above-described embodiment is provided with the same reference numeral, and is not described again if appropriate.

Modified Example 1

Figure 8:
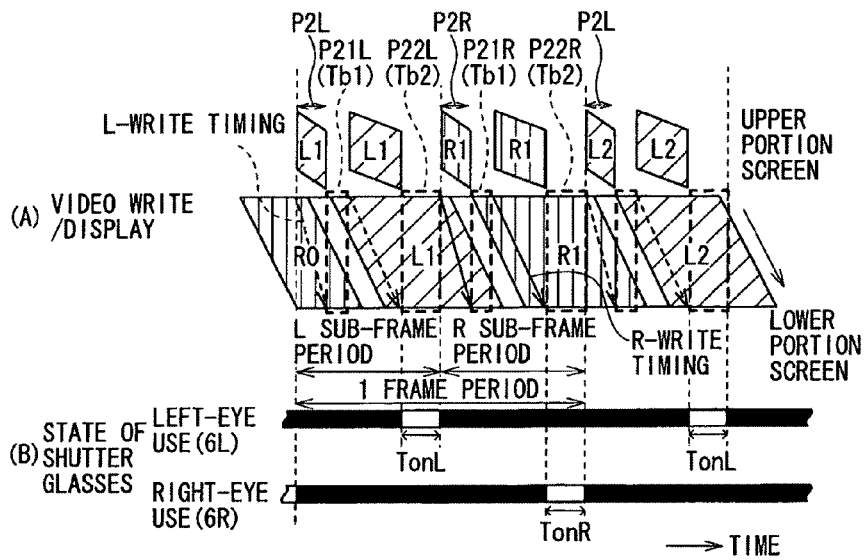
FIG. 8 is a timing chart of a stereoscopic video display operation in a modified example 1 of the invention.

FIG. 8 is a timing chart of a stereoscopic video display operation in a modified example 1, and similarly to FIG. 4 and others, A shows a video write/display operation, and B shows the state of the shutter glasses 6, i.e., the left-eye lens 6L and the right-eye lens 6R.

In this modified example 1, the timing control section 43 performs timing control in such a manner that, in each of the right- and left-eye video signals DR and DL, the period for the first-time output (writing) of the unit video pieces is to be shorter in length than the period for the second-time and later output (writing) of the unit video pieces. To be specific, in this example, the timing control is so performed that the period for the first-time output of the unit video pieces, e.g., the left-eye video pieces L1 and L2 and the right-eye video piece R1, is to be shorter in length than the period for the second-time output of the unit video pieces as indicated by arrows P2L and P2R in A of FIG. 8. In this case, because the periods for the first- and second-time output (writing) vary in length, the arrows of "L-write" and "R-write" in A of FIG. 8 also vary in angle between the periods for the first- and second-time output.

As such, similarly to the embodiment described above, the second-time blanking period Tb2 has the Duty longer than that in the first-time blanking period Tb1 (refer to reference numerals P21L, P22L, P21R, and P22R in A of FIG. 8). Such advantages can be achieved with no more need to change the Duty of the first-time blanking period Tb1 as in the embodiment described above. The advantages will be more apparent by a combination of such a technique in this modified example 1 and the technique of the above-described embodiment.

In order to implement such length reduction of the period for the first-time output of the unit video pieces compared with the period for the second-time or later output of the unit video pieces, the timing control may be performed specifically in the following two manners, for example. That is, in the first manner, the timing control is so performed that the write frequency during the line-sequential scanning is to be higher during the first-time output of the unit video pieces than during the second-time and later output thereof. Such a write frequency during the line-sequential scanning includes a dot clock frequency for use in the data driver 51, and a system clock frequency in the liquid crystal display 1, for example.

In the second manner, the timing control is so performed that the number of horizontal lines to be selected simultaneously during the line-sequential scanning (hereinafter, such lines are referred to as simultaneous-selection horizontal lines) is to be larger during the first-time output of the unit video pieces than during the second-time and later output thereof. To be specific, during the normal operation, the number of the simultaneous-selection horizontal lines during the line-sequential scanning is one in both the first- and second-time write periods. However, with the timing control in the second manner, the first-time write period may have the simultaneous-selection horizontal lines larger in number than in the second-time and later write periods, e.g., two in the first-time write period, and one in the second-time and later write periods. Herein, the number of the simultaneous-selection horizontal lines during the normal operation is not restrictive to one as described above. That is, in the example in A of FIG. 9, the number of the simultaneous-selection horizontal lines is equally two in the first- and second-time write periods T101 and T102 during the line-sequential scanning (refer to a reference numeral H100 in the drawing). On the other hand, in the examples in B and C of FIG. 9, the first-time write periods T11 and T21 both have the simultaneous-selection horizontal lines larger in number than in the second-time write periods T12 and T22, e.g., four in the first-time write periods, and two in the second-time write periods (refer to reference numerals H11, H12, H21, and H22 in the drawing).

Figure 9:
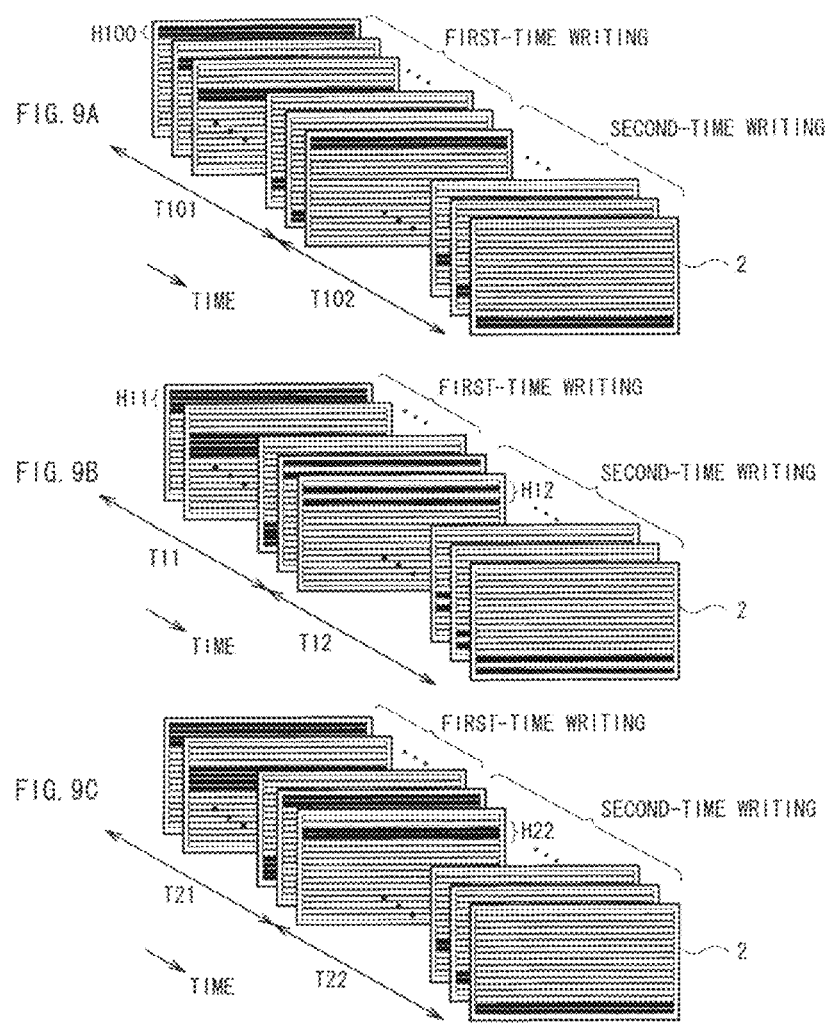
FIGS. 9A to 9C are each a timing diagram for illustrating an exemplary technique for implementing the stereoscopic video display operation of FIG. 8.

To be more specific, in B of FIG. 9, selected in the second-time write period T12 are any two consecutive even- or odd-numbered simultaneous-selection horizontal lines. In the first-time write period T11, selected are any of the four consecutive simultaneous-selection horizontal lines, i.e., two even-numbered lines and two odd-numbered lines in a row, considering that images in the neighboring lines are likely to have similar image information. With such a line selection, the scanning in the first-time write period T11 is completed twice faster than in the second-time write period T12, and the screen is scanned in its entirety as such. Note that, in this case, the number of the simultaneous-selection horizontal lines in the second-time write period is the same as during the normal operation, i.e., two lines, and thus no information degradation is expected.

On the other hand, the case in C of FIG. 9 is basically similar to the case in B of FIG. 9, but selected in the second-time write period T22 are any of the two consecutive simultaneous-selection horizontal lines, i.e., not alternate two lines as in B of FIG. 9.

As described above, in such a modified example 1, the timing control section 43 performs the timing control in such a manner that, in each of the right- and left-eye video signals DR and DL, the period for the first-time output of the unit video pieces is to have the length longer than that in the period for the second-time output thereof. As such, the advantages similar to those in the above embodiment favorably lead to the effects similar to those achieved therein. That is, during viewing of stereoscopic display video, the occurrence of crosstalk can be favorably prevented at the same time as preventing any reduction in display brightness.

Modified Example 2

Figure 10:
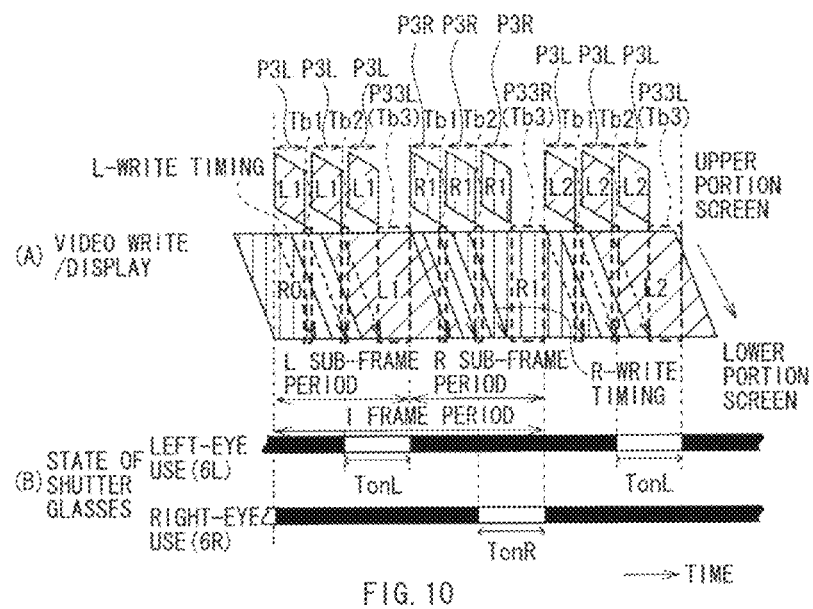
FIG. 10 is a timing chart of a stereoscopic video display operation in a modified example 2 of the invention.

FIG. 10 is a timing chart of a stereoscopic video display operation in a modified example 2, and similarly to FIG. 4 and others, A shows a video write/display operation, and B shows the state of the shutter glasses 6, i.e., the left-eye lens 6L and the right-eye lens 6R.

In this modified example 2, the timing control section 43 performs timing control in such a manner that, in each of the right- and left-eye video signals DR and DL, every period for output of the unit video pieces is reduced in length in the same proportion to be shorter than in the case of outputting the unit video pieces all at the equally-controlled time for the equally-controlled duration. That is, in this example, as indicated by arrows of P3L and P3R in A of FIG. 10, the periods for the first- to third-time output of the unit video pieces are all reduced in length in the same proportion to be shorter.

Figure 11:
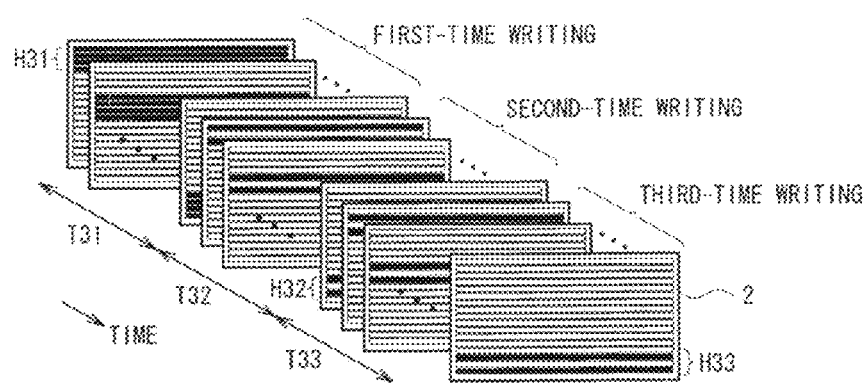
FIG. 11 is a timing chart for illustrating an exemplary technique for implementing the stereoscopic video display operation of FIG. 10.

For implementation of such reduction of length, specifically, the timing control is performed as shown in FIG. 11, for example. That is, with the timing control, first of all, a first-time write period T31 is so controlled as to have the simultaneous-selection horizontal lines larger in number than in second- and third-time write periods T32 and T33, e.g., four in the first-time write period, and two in the second- and third-time periods (refer to reference numerals H31 to H33 in the drawing). Thereafter, in the second- and third-time write periods T32 and T33, the simultaneous-selection horizontal lines for scanning are decimated based on the number thereof in total on the display screen in its entirety (in this example, decimation to a half) (refer to reference numerals H32 and H33 in the drawing).

As such, similarly to the embodiment and the modified example 1 described above, the second- and third-time blanking periods Tb2 and Tb3 both have the Duty longer than that in the first-time blanking period Tb1 (refer to reference numerals P33L and P33R in A of FIG. 10). Moreover, unlike in the comparison example 1 described above, the periods for the first- to third-time output (writing) all have the same length so that any adjustment during overdrive processing can be made with a relative ease.

As described above, in such a modified example 2, the timing control section 43 performs the timing control in such a manner that, in each of the right- and left-eye video signals DR and DL, every period for output of the unit video pieces is reduced in length in the same proportion to be shorter than in the case of outputting the unit video pieces all at the equally-controlled time for the equally-controlled Duty. Such advantages similar to those in the above embodiment favorably lead to the effects similar to those achieved therein. That is, during viewing of stereoscopic display video, crosstalk can be favorably prevented while preventing any reduction in display brightness.

Modified Example 3

The scanning techniques in the modified examples 1 and 2 described above may be performed alternately with the scanning technique in the normal operation (refer to A of FIG. 9) whenever necessary.

Figure 12:
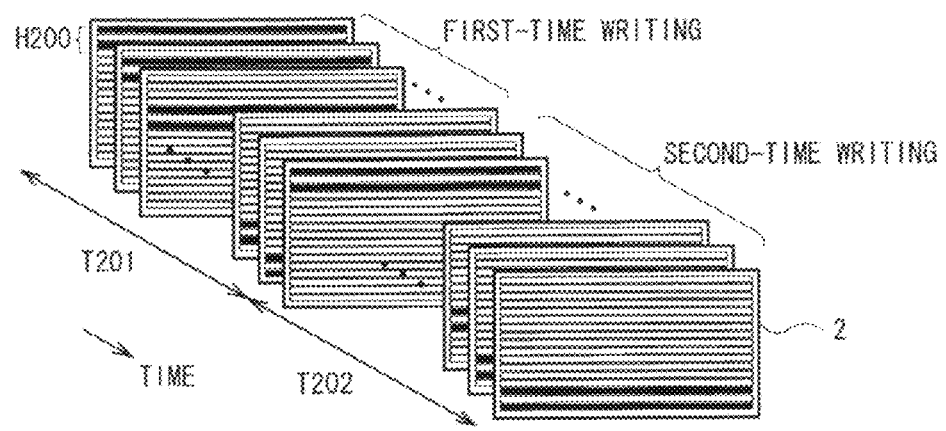
FIG. 12 is a timing chart of a stereoscopic video display operation in a modified example 3 of the invention.

If this is the case, for the scanning technique in the normal operation, selecting alternate two simultaneous-selection horizontal lines as shown in FIG. 12 is more preferable than selecting any two or more adjacent simultaneous-selection horizontal lines as in A of FIG. 9. This is because of the ease of constructing a display device circuit, i.e., in-panel bus line, and a scanning circuit.

Modified Example 4

Figure 13:
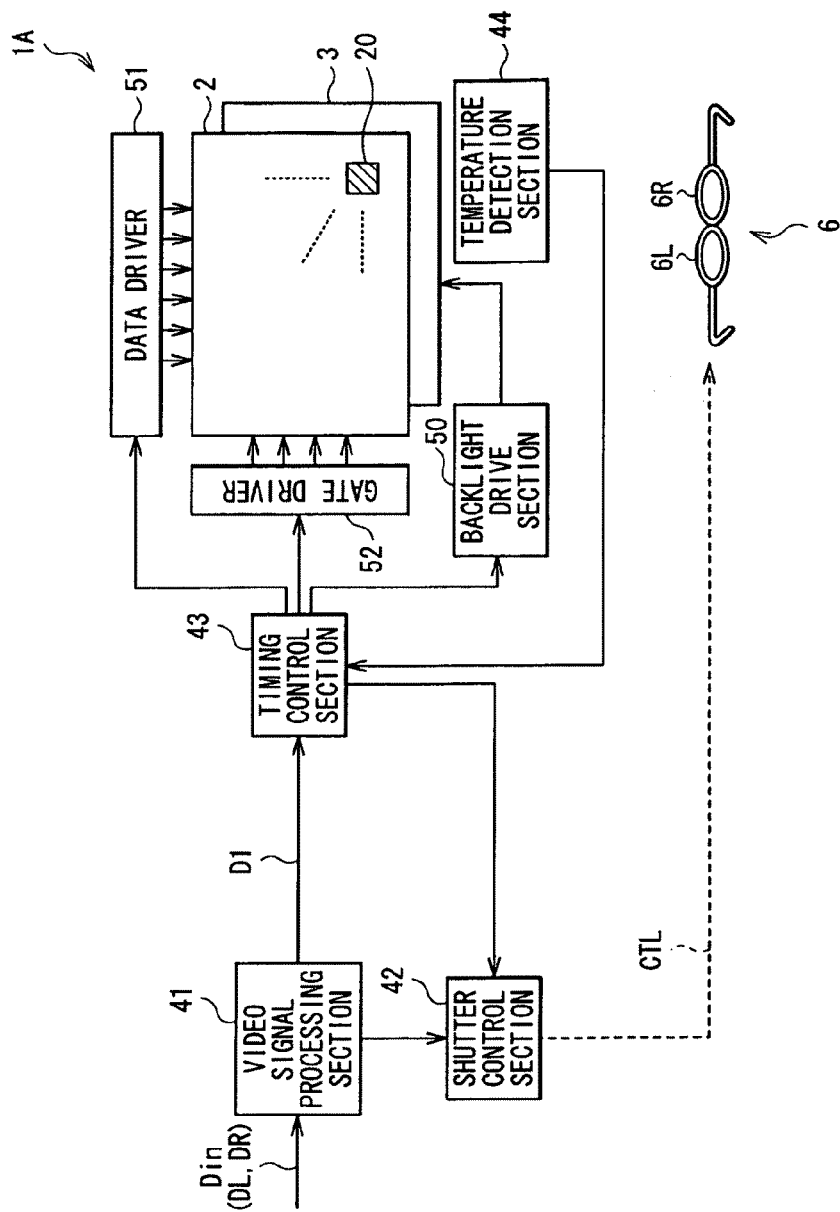
FIG. 13 is a block diagram showing the entire configuration of a video display system provided with a video display device in a modified example 4 of the invention.

FIG. 13 is a block diagram showing the configuration of a video display system in a modified example 4. In the video display system in this modified example 4, a liquid crystal display 1A is provided as an alternative to the liquid crystal display 1 in the embodiment described above. Compared with the liquid crystal display 1, this liquid crystal display 1A is additionally provided with a temperature detection section 44.

The temperature detection section 44 serves to detect the temperature in the operation environment, and output the detection result to the timing control section 43. Such a temperature detection section 44 is configured by a thermistor, for example.

With such a configuration, the timing control section 43 in this modified example 4 performs timing control based on any temperature change observed in the operation environment, i.e., to change the Duty of the second-time blanking period Tb2 (second blanking period) corresponding to the shutter-open period of the shutter glasses 6. To be specific, the second-time blanking period Tb2 is reduced in Duty when the operation environment is reduced in temperature, and the second-time blanking period Tb2 is increased in Duty when the operation environment is increased in temperature. When the operation environment is low in temperature, the response speed of the liquid crystal material is reduced, and thus crosstalk is caused easily, i.e., becomes noticeable. When the operation environment is high in temperature, on the other hand, the response speed of the liquid crystal material is increased, and thus crosstalk is not caused that easily, i.e., becomes hardly noticeable. Moreover, as described in the modified example 1 above, if used is the technique of increasing a dot clock frequency, for example, the blanking period may be reduced in Duty when the operation environment is low in temperature, and the blanking period may be increased in Duty when the operation environment is high in temperature. Such a reduction, i.e., reduction of the Duty of the blanking period when the operation environment is low in temperature (reduction of the dot clock frequency), is for preventing any display inconsistency possibly caused due to not enough charging considering the performance capabilities of the TFTs. On the other hand, when the operation environment is high in temperature, the charging can be sufficient in level. Therefore, increasing the Duty of the blanking period, i.e., increasing the dot clock frequency, can lead to the improvement of the display brightness and to the prevention of the occurrence of crosstalk.

As such, in this modified example 4, any temperature change observed in the operation environment is used as a basis to change the Duty of the second-time blanking period Tb2 corresponding to the shutter-open period of the shutter glasses 6 so that the occurrence of crosstalk can be further prevented.

Modified Example 5

Alternatively, in accordance with the contents of each unit video piece, the timing control section 43 may change the Duty of the second-time blanking period Tb2 corresponding to the shutter-open period of the shutter glasses 6. To be specific, the second-time blanking period Tb2 may be varied in Duty depending on the contents of each unit video piece, e.g., still or moving image, or high or low in contrast.

Modified Example 6

Figure 14A:
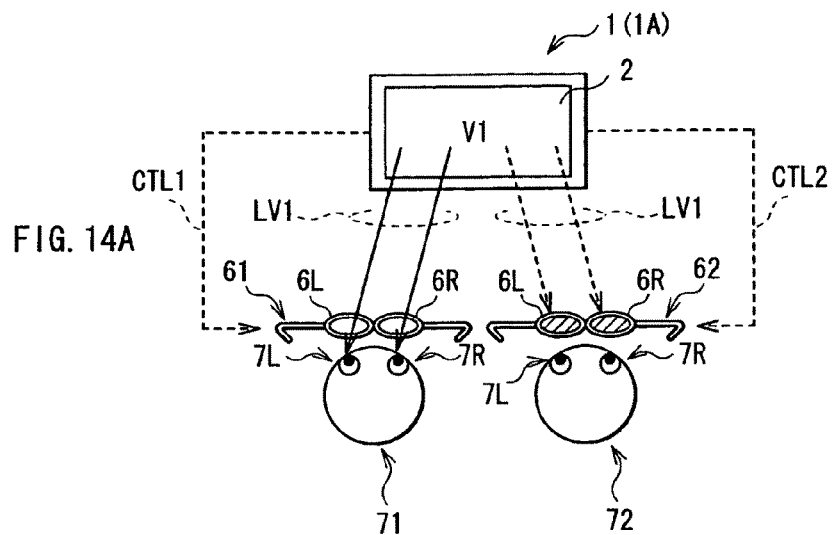
FIGS. 14A and 14B are each a schematic diagram outlining a multi-video display operation in a video display system in a modified example 6 of the invention.
Figure 14B:
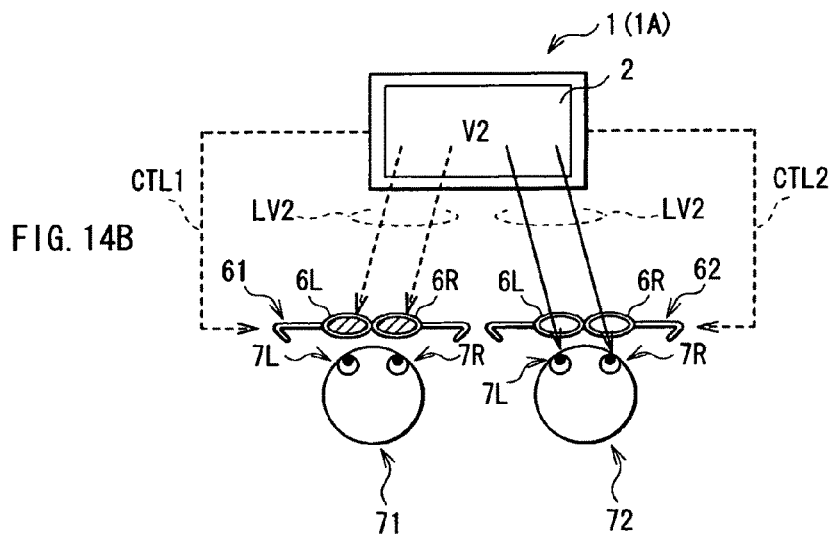

FIGS. 14A and 14B are each a schematic diagram outlining a video display operation in a video display system, i.e., a multi-view system, in a modified example 6. In this modified example 6, as an alternative to the stereoscopic video display operation described above, exemplified is a multi-video display operation of providing a plurality of different video pieces (two in this example) for individual viewing by a plurality of users (two in this example).

With a multi-view system in this modified example 6, a first video piece is displayed alternately with a second video piece. The first video piece is the one based on a first video signal corresponding to a first user, and the second video piece is the one based on a second video signal corresponding to a second user. That is, unlike stereoscopic video display in the embodiment and examples described above, i.e., the left- and right-eye lenses 6L and 6R in the shutter glasses 6 respectively display the left- and right-eye video pieces, in this modified example 6, various different video pieces are each displayed to its corresponding user.

To be specific, as shown in FIG. 14A, in a display period of a first video piece V1, due to a control signal CTL1, the right- and left-eye lenses 6R and 6L are both in the open state in shutter glasses 61 in use by a user 71. Also in the display period of the first video piece V1, due to a control signal CTL2, the right- and left-eye lenses 6R and 6L are both in the closed state in shutter glasses 62 in use by a user 72. That is, with the shutter glasses 61 in use by the user 71, a display light LV1 of the first video piece V1 is passed through, and with the shutter glasses 62 in use by the user 72, this display light LV1 is blocked.

On the other hand, as shown in FIG. 14B, in a display period of a second video piece V2, due to the control signal CTL2, the right- and left-eye lenses 6R and 6L are both in the open state in the shutter glasses 62 in use by the user 72. Also in the display period of the second video piece V2, due to the control signal CTL1, the right- and left-eye lenses 6R and 6L are both in the closed state in the shutter glasses 61 in use by a user 71. That is, with the shutter glasses 62 in use by the user 72, a display light LV2 of the video piece V2 is passed through, and with the shutter glasses 61 in use by the user 71, this display light LV2 is blocked.

When such a state change is repeated in a time-division manner, the different video pieces, i.e., video pieces V1 and V2, are made available for the two users 71 and 72 for their individual viewing, i.e., the multi-view mode is implemented.

As such, also with the multi-video display operation in this modified example 6, the effects similar to those in the embodiment and others described above can be favorably achieved by the timing control section 43 performing such timing control as described in the embodiment and others above.

Note that exemplified in this modified example 6 is the case of providing two different video pieces to two different users for their individual viewing. This is surely not restrictive, and the invention is surely applicable to a case of providing three different video pieces to three different users for their individual viewing. The number of the video pieces is not necessarily the same as the number of shutter glasses, i.e., a plurality of users may view a video piece at the same time by using a plurality of shutter glasses all responsively going into open/close state during viewing of the video piece.

OTHER MODIFIED EXAMPLES

While the invention has been described in detail with the embodiment and modified examples, the foregoing description is in all aspects illustrative and not restrictive, and it is understood that numerous other modifications and variations can be devised.

Exemplified in the embodiment and others described above is the case that a left-eye video signal is written into the liquid crystal display panel 2 twice in a row in each L sub-frame period in one frame period, thereby displaying the left-eye video pieces L1, L2, and others. This is surely not restrictive, and alternatively, a video signal may be written into the liquid crystal display panel 2 three times in a row in each sub-frame period in one frame period. Also in such a case, the effects similar to those in the embodiment described above can be achieved.

As to the write frequency during the line-sequential scanning described in the embodiment and others above, e.g., the dot clock frequency and the system clock frequency, the frequency value for 2D (two-dimensional) video display may be different from that for 3D (three-dimensional, stereoscopic) video display. To be specific, the write frequency during the line-sequential scanning for 3D video display may be set higher than that for 2D video display, for example.

Further, in the embodiment and others above, the video display device is exemplified by the liquid crystal display provided with the liquid crystal display section, which is configured by liquid crystal elements. The invention is surely applicable to any other types of video display devices, e.g., specifically applicable to a video display device using a PDP (Plasma Display Panel) or an organic EL (Electro Luminescence) display.

In addition thereto, the process procedure in the embodiment and others above may be performed by hardware or by software. When the process procedure is performed by software, a program configuring the software is installed into a general-purpose computer, for example. Such a program may be recorded in advance in a recording medium provided in the computer.

It should be understood by those skilled in the art that various modifications, combinations, sub-combinations and alterations may occur depending on design requirements and other factors insofar as they are within the scope of the appended claims or the equivalents thereof.

What is claimed is:

1. A video display device, comprising:
    a video processing section that performs output control over a plurality of video streams each including a plurality of unit video pieces in time sequence for output of the unit video pieces each for a plurality of times in a row, and for time-division switching of the video streams for output;
    a timing control section configured to receive the unit video pieces from the video processing section, perform timing control over each of the unit video pieces to make variable at least either a starting time or a duration of each blanking period located between output periods of the unit video pieces coming from the video processing section, and transmit the unit video pieces on which timing control has been performed;
    a display section that performs video display based on each of the unit video pieces after the timing control, wherein the timing control section performs the timing control over each of the video streams to have, in a blanking period following immediately after a second-time or later output of the unit video pieces, at least one second blanking period that is longer in duration (Duty) than a first blanking period following immediately after a first-time output of the unit video pieces,
    wherein for each output of a unit video piece a plurality of times in a row, the first blanking period occurs between consecutive outputs of the unit video piece and the second blanking period occurs after the final output of the unit video piece and before the first output of a next unit video piece;
    a shutter control section that performs control over shutter glasses in terms of open-close operation to open and close in synchronization with a display switching among the plurality of video streams in the display section,
    wherein the timing control section performs the timing control over the shutter control section to make the shutter glasses to go into an open state in the second blanking period in each of the video streams such that the duration of each open state is longer than the duration of each first blanking period; and
    a temperature detection section, coupled to the timing control section, for detecting temperature in the operation environment,
    wherein the timing control section performs the timing control to change the Duty of the second blanking period in accordance with a temperature change observed in an operation environment, and
    wherein the timing control section reduces further the Duty of the second blanking period in response to a temperature reduction in the operation environment, and increases further the Duty of the second blanking period in response to a temperature increase therein.

2. The video display device according to claim 1, wherein the timing control section performs the timing control over each of the video streams to start earlier the second-time or later output of the unit video pieces than in a case of outputting the unit video pieces all at an equally-controlled timing for an equally-controlled duration.

3. The video display device according to claim 1, wherein the timing control section performs the timing control over each of the video streams to be shorter in length for a period for the first-time output of the unit video pieces than for periods for the second-time or later output thereof.

4. The video display device according to claim 1, wherein the timing control section performs the timing control over each of the video streams to be shorter in length in the same proportion for the periods of the first-time and later output of the unit video pieces than in a case of outputting the unit video pieces all at an equally-controlled timing for an equally-controlled duration.

5. The video display device according to claim 1, wherein the timing control section performs the timing control to change the Duty of the second blanking period depending on contents of each of the unit video pieces.

6. The video display device according to claim 1, wherein the timing control section performs the timing control for, in each of the video streams, a unit frame period being a combination of periods for the first-time and later output of the unit video pieces and the blanking period following immediately after each of the output periods to continuously have a length same as in a case of outputting the unit video pieces all at an equally-controlled timing for an equally-controlled duration.

7. The video display device according to claim 1, wherein the display section performs the video display by writing a video signal corresponding to each of the unit video pieces at the same as scanning a display screen line-sequentially, and
the timing control section performs the timing control over a write frequency for the line-sequential scanning to be higher during three-dimensional (stereoscopic) video display in the display section than during two-dimensional video display therein.

8. The video display device according to claim 1, wherein the plurality of video streams include a left-eye video stream and a right-eye video stream producing parallax.

9. The video display device according to claim 1, wherein the display section is a liquid crystal display section configured using a liquid crystal element.

10. The video display device according to claim 3, wherein the display section performs the video display by writing a video signal corresponding to each of the unit video pieces at the same as scanning a display screen line-sequentially, and
the timing control section performs the timing control over a write frequency for the line-sequential scanning to be higher during the first-time output of the unit video pieces than during the second-time or later output thereof.

11. The video display device according to claim 3, wherein the display section performs the video display by writing a video signal corresponding to each of the unit video pieces at the same as scanning a display screen line-sequentially, and
the timing control section performs the timing control over the number of simultaneous-selection horizontal lines for use during the line-sequential scanning to be larger for the first-time output of the unit video pieces than for the second-time or later output thereof.

12. The video display device according to claim 4, wherein the display section performs the video display by writing a video signal corresponding to each of the unit video pieces at the same as scanning a display screen line-sequentially, and
the timing control section performs the timing control over
the number of simultaneous-selection horizontal lines for use during the line-sequential scanning to be larger for the first-time output of the unit video pieces than for the second-time or later output thereof, and
over the number of the simultaneous-selection horizontal lines to be scanned during the second-time or later output of the unit video pieces to be decimated based on the number of the horizontal lines in the entire display screen.

13. A video display system, comprising:
a video display device that performs video display by time-division switching of a plurality of video streams each including a plurality of unit video pieces in time sequence; and
shutter glasses that perform an open/close operation in synchronization with the switching of the video streams in the video display device, wherein
the video display device includes
a video processing section that performs output control over the plurality of video streams for output of the unit video pieces each for a plurality of times in a row, and for enabling the time-division switching of the video streams for output,
a timing control section configured to receive the unit video pieces from the video processing section, perform timing control over the unit video pieces to make variable at least either a starting time or a duration of each blanking period located between output periods of the unit video pieces coming from the video processing section, and transmit the unit video pieces on which timing control has been performed,
a display section that performs video display based on each of the unit video pieces after the timing control, and
the timing control section performs the timing control over each of the video streams to have, in a blanking period following immediately after a second-time or later output of the unit video pieces, at least one second blanking period that is longer in Duty than a first blanking period following immediately after a first-time output of the unit video pieces,
wherein for each output of a unit video piece a plurality of times in a row, the first blanking period occurs between consecutive outputs of the unit video piece and the second blanking period occurs after the final output of the unit video piece and before the first output of a next unit video piece,
a shutter control section that performs control over shutter glasses in terms of open-close operation to open and close in synchronization with a display switching among the plurality of video streams in the display section,
wherein the timing control section performs the timing control over the shutter control section to make the shutter glasses to go into an open state in the second blanking period in each of the video streams such that the duration of each open state is longer than the duration of each first blanking period, and
a temperature detection section, coupled to the timing control section, for detecting temperature in the operation environment,
wherein the timing control section performs the timing control to change the Duty of the second blanking period in accordance with a temperature change observed in an operation environment, and
wherein the timing control section reduces further the Duty of the second blanking period in response to a temperature reduction in the operation environment, and increases further the Duty of the second blanking period in response to a temperature increase therein.

* * * * *